(12) United States Patent
Lee (10) Patent No.: US 8,107,005 B2
(45) Date of Patent: Jan. 31, 2012

(54) METHOD OF MANUFACTURING AN IMAGE SENSOR MODULE

(75) Inventor: Kyoung Tai Lee, Gyeonggi-do (KR)

(73) Assignee: Samsung Electro-Mechanics Co., Ltd., Suwon (KR)

(*) Notice: Subject to any disclaimer, the term of this patent is extended or adjusted under 35 U.S.C. 154(b) by 904 days.

(21) Appl. No.: 12/081,686

(22) Filed: Apr. 18, 2008

(65) Prior Publication Data

US 2009/0161006 A1    Jun. 25, 2009

(30) Foreign Application Priority Data

Dec. 20, 2007   (KR) .................. 10-2007-0134183

(51) Int. Cl.
*H04N 5/225* (2006.01)
(52) U.S. Cl. ....................................... 348/374
(58) Field of Classification Search .............. None
See application file for complete search history.

(56) References Cited

U.S. PATENT DOCUMENTS

| 7,665,915 B2* | 2/2010 | Lee .................. 396/529 |
| 7,825,985 B2* | 11/2010 | Westerweck et al. ......... 348/374 |
| 2007/0146534 A1* | 6/2007 | Kim et al. .................. 348/340 |
| 2007/0223913 A1* | 9/2007 | Lee .................. 396/529 |
| 2008/0142917 A1* | 6/2008 | Lee et al. ................ 257/432 |

FOREIGN PATENT DOCUMENTS

JP    2005-064591    3/2005

\* cited by examiner

*Primary Examiner* — Justin P Misleh (57) ABSTRACT

Provided is an image sensor module including a lower substrate having a plurality of top pads formed on the top surface thereof; an upper substrate that is installed along the edge of the top surface of the lower substrate and has a plurality of connection grooves formed on the inner side surface thereof, each connection groove having a side pad corresponding to each of the top pads of the lower substrate; an image sensor installed on the top surface of the upper substrate; and a connection element that electrically connects the top pads and the side pads.

2 Claims, 6 Drawing Sheets

```
┌─────────────────────────────────────────────────┐
│  MOUNT PASSIVE ELEMENTS ON LOWER SUBSTRATE      │
└─────────────────────────────────────────────────┘
                       ↓
┌─────────────────────────────────────────────────┐
│   SURFACE-MOUNT UPPER SUBSTRATE ON TOP          │
│        SURFACE OF LOWER SUBSTRATE               │
└─────────────────────────────────────────────────┘
                       ↓
┌─────────────────────────────────────────────────┐
│   SEAL EXPOSED PORTION OF TOP SURFACE OF        │
│              LOWER SUBSTRATE                    │
└─────────────────────────────────────────────────┘
                       ↓
┌─────────────────────────────────────────────────┐
│              MOUNT IMAGE SENSOR                 │
└─────────────────────────────────────────────────┘
```

[FIG. 1]

- Prior Art -

[FIG. 2]

- Prior Art -

[FIG. 3]

- Prior Art -

METHOD OF MANUFACTURING AN IMAGE SENSOR MODULE

CROSS-REFERENCE TO RELATED APPLICATIONS

This application claims the benefit of Korean Patent Application No. 10-2007-0134183 filed with the Korea Intellectual Property Office on Dec. 20, 2007, the disclosure of which is incorporated herein by reference.

BACKGROUND OF THE INVENTION

1. Field of the Invention

The present invention relates to an image sensor, a method of manufacturing the same, and a camera module having the same.

2. Description of the Related Art

With the recent development of mobile terminals such as portable phones and personal digital assistants (PDAs), the mobile terminals provide a phone call function and are used as multi-convergence devices. The most representative of the multi-convergence is a camera module. The resolution of the camera module changes from 300,000 pixels (VGA) to 8,000,000 pixels. Moreover, the camera module provides various additional functions, such as auto-focusing (AF) and optical zoom. Generally, camera modules are applied to various IT devices, such as camera phones, smart phones, and mobile communication terminals.

The camera modules are manufactured by using main parts of charge coupled device (CCD) or complementary metal oxide semiconductor (CMOS) image sensors. Incident light transmitted through the lens is condensed by the image sensor and is stored as data in the memory. The stored data is displayed as an image through a display medium, such as liquid crystal display (LCD) or PC monitor.

Hereinafter, a conventional image sensor module and a camera module having the same will be described with reference to FIGS. 1 to 3.

Figure 1:
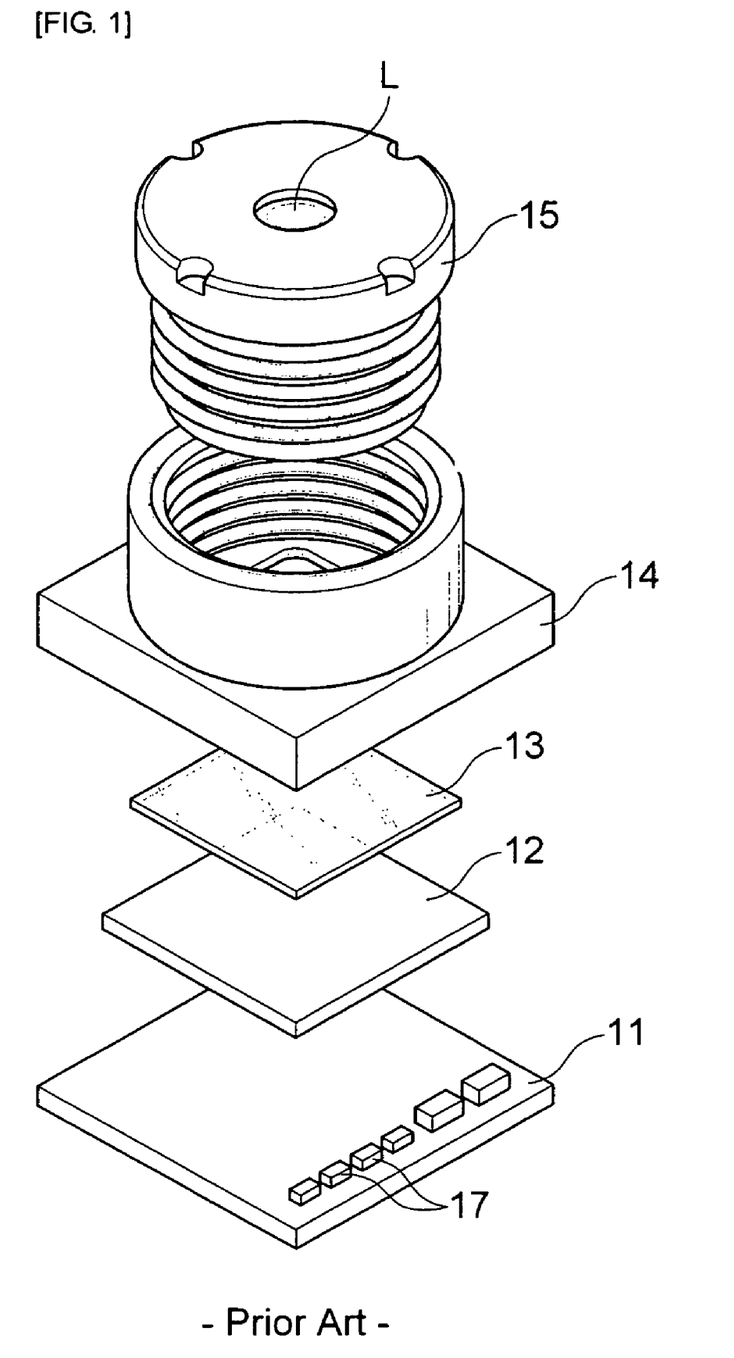
FIG. 1 is an exploded perspective view of a conventional COB camera module.

FIG. 1 is an exploded perspective view of a conventional chip-on-board (COB) camera module. FIG. 2 is an exploded perspective view of a conventional chip-on-film (FOB) camera module. FIG. 3 is an exploded perspective view of a conventional socket-type camera module.

As shown in FIG. 1, the conventional COB camera module includes a rigid printed circuit board (RPCB) 11, an image sensor 12, an infrared ray (IR) cut-off filter 13, a housing 14, and a lens barrel 15.

The RPCB 11 has various electronic parts and semiconductor elements mounted thereon. In particular, the RPCB 11 has passive elements 17 mounted on the top surface thereof at one side of the image sensor 12, the passive elements 17 preventing noise of the camera module.

The image sensor 12 is composed of a CCD or CMOS image sensor and converts light into an electrical signal, the light being incident through the IR cut-off filter 13 via a lens group L.

The IR cut-off filter 13 is installed on a lower step portion of the housing 14 so as to cut off long-wavelength infrared rays included in the light incident on the image sensor 12.

The lens barrel 15 has the lens group L mounted therein and is assembled to the housing through a screw method.

Figure 2:
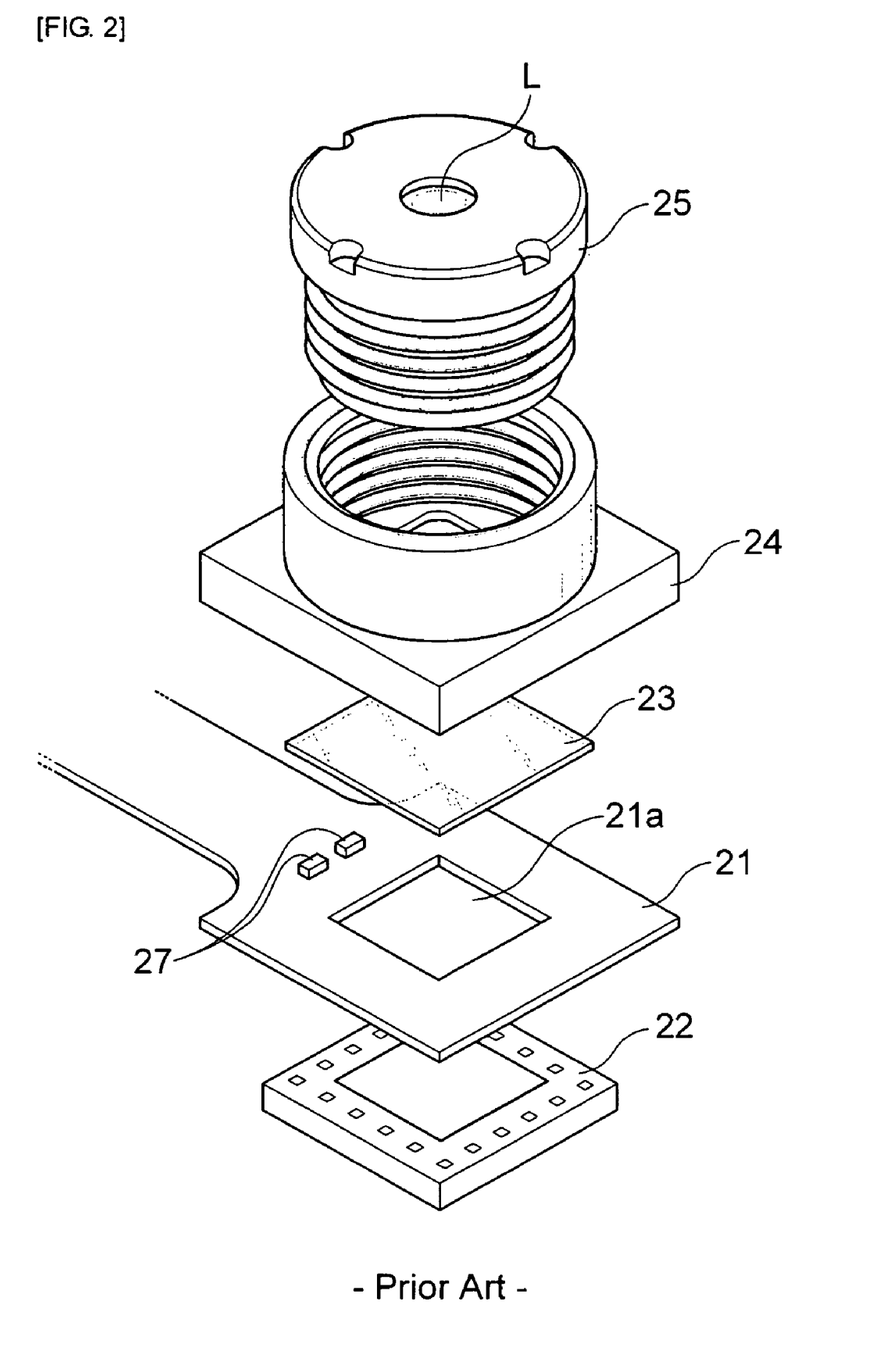
FIG. 2 is an exploded perspective view of a conventional FOB camera module.

As shown in FIG. 2, the conventional COF camera module includes a flexible printed circuit board (FPCB) 21, an image sensor 22, an IR cut-off filter 23, a housing 24, and a lens barrel 25.

The FPCB 21 has a rectangular window 21a formed therein, and electronic parts such as capacitors and resistors for driving the image sensor 22 are mounted on the FPCB 21. In particular, passive elements 27 for preventing noise of the camera module are mounted on the top surface of the FPCB 21 at one side of the window 21a.

The image sensor 22 is composed of a CCD or CMOS image sensor and is mounted on the bottom surface of the FPCB 21 so as to convert light into an electrical signal, the light being incident through the window 21a of the FPCB 21.

The IR cut-off filter 23 is installed on the top surface of the FPCB 21 so as to cut off long-wavelength infrared rays in the light incident on the image sensor 22 through the window 21a of the FPCB 21.

The lens barrel 25 has a lens group L mounted therein and is assembled to the housing 24 through a screw method.

The FPCB 21 has a connector (not shown) installed on an extended end thereof, the connector serving to electrically connect the camera module to an external device.

Figure 3:
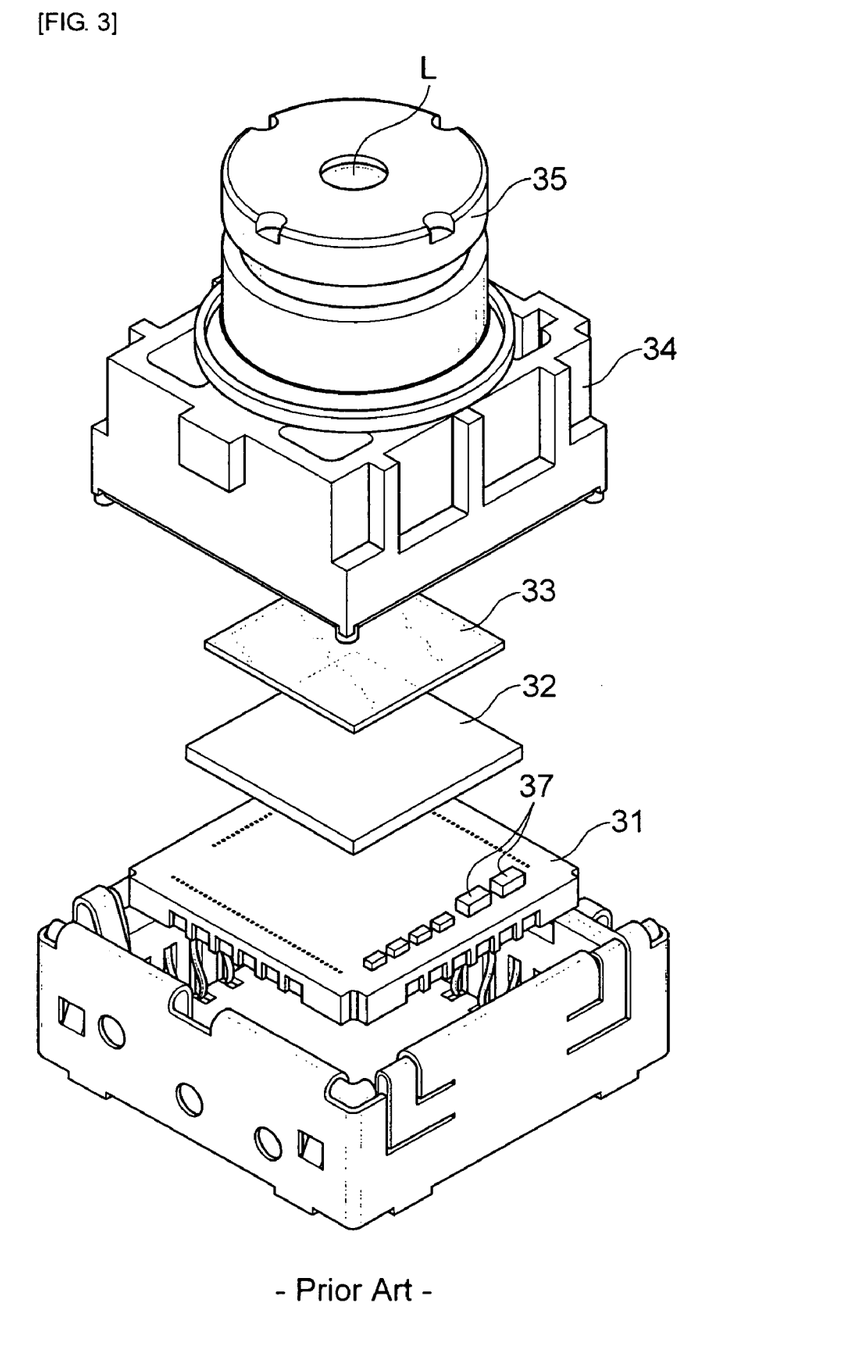
FIG. 3 is an exploded perspective view of a conventional socket-type camera module.

The conventional socket-type camera module shown in FIG. 3 is implemented by modifying the conventional COB camera module shown in FIG. 1. In the socket-type camera module, a ceramic substrate 31 is used instead of the FPCB, in order to apply a side contact method.

That is, the socket-type camera module includes a ceramic substrate 31, an image sensor 32, an IR cut-off filter 33, a housing 34, and a lens barrel 35. The ceramic substrate 31 has a pad for connection with a terminal of a socket, the pad being formed in a groove formed on a side surface of the ceramic substrate 31. The groove is formed in the lower portion of the side surface of the ceramic substrate 31 such that when an adhesive for coupling the ceramic substrate 31 and the housing 34 is applied, the applied adhesive is prevented from being flowing into the pad.

On the center of the top surface of the ceramic substrate 31, the image sensor 32 is mounted. Further, on the edge of the top surface, various electronic parts and semiconductor elements for driving the image sensor 32 are mounted. In particular, passive elements 37 for preventing noise of the camera module are mounted on the top surface of the ceramic substrate 31 at one side of the image sensor 32.

However, the above-described camera modules have the following problems.

The camera modules require the passive elements 17, 27, and 37 for preventing noise. Therefore, as the passive elements 17, 27, and 37 are mounted on the top surfaces of the substrates 11, 21, and 31 at one side of the image sensors 12, 22, and 32, the size of the camera modules inevitably increases.

That is, since a space for mounting the passive elements 17, 27, and 37 as well as the image sensors 12, 22, and 32 is needed, the size of the substrates 11, 21, and 31 increases.

Further, as the size of the substrates 11, 21, and 31 increases toward the side where the passive elements 17, 27, and 27 are mounted, the center of the lens group L is not positioned in the center of the substrates 11, 21, and 31.

To solve such a problem, when the size of the substrates 11, 21, and 31 at an opposite side to the side where the passive elements 17, 27, and 37 are mounted is increased, the size of the substrates 11, 21, and 31 further increases.

The passive elements 17, 27, and 37 may be mounted on the bottom surface of the respective substrates 11, 21, and 31. However, such a construction cannot be applied to the socket-type camera module, and the height of the camera module inevitably increases. Further, when the camera module is assembled into an external device, short circuit may occur.

Further, in the conventional socket-type camera module, the expensive ceramic substrate 31 should be used for the side contact method. Therefore, a manufacturing time and cost increases.

SUMMARY OF THE INVENTION

An advantage of the present invention is that it provides an image sensor module, a method of manufacturing the same, and a camera module having the same, which can reduce a manufacturing time to thereby reduce a manufacturing cost and can enhance productivity.

Additional aspects and advantages of the present general inventive concept will be set forth in part in the description which follows and, in part, will be obvious from the description, or may be learned by practice of the general inventive concept.

According to an aspect of the invention, an image sensor module comprises a lower substrate having a plurality of top pads formed on the top surface thereof; an upper substrate that is installed along the edge of the top surface of the lower substrate and has a plurality of connection grooves formed on the inner side surface thereof, each connection groove having a side pad corresponding to each of the top pads of the lower substrate; an image sensor installed on the top surface of the upper substrate; and a connection element that electrically connects the top pads and the side pads.

The connection element may be composed of solder which is provided on the top pads of the lower substrate and the side pads of the upper substrate through a surface mounting technology (SMT).

Alternatively, the connection element may be composed of conductive paste which is bonded to the top pads of the lower substrate and the side pads of the upper substrate.

The upper substrate may be formed in a rectangular ring shape corresponding to the edge of the top surface of the lower substrate.

The upper substrate may be formed in a shape corresponding to one side, two sides facing each other, or three adjacent sides among four sides of the edge of the top surface of the lower substrate.

According to another aspect of the invention, a method of manufacturing an image sensor module, which includes a lower substrate having a plurality of top pads formed on the top surface thereof; an upper substrate that is installed along the edge of the top surface of the lower substrate and has a plurality of connection grooves formed on the inner side surface thereof, each connection groove having a side pad corresponding to each of the top pads of the lower substrate; and an image sensor installed on the top surface of the upper substrate, comprises the steps of: mounting various elements on the central portion of the top surface of the lower substrate; connecting the side pads of the upper substrate to the top pads of the lower substrate through SMT such that the top pads of the lower substrate are electrically connected to the sides pads of the upper substrate; and mounting the image sensor on the top surface of the upper substrate.

The method may further comprise the step of: sealing an exposed portion of the top surface of the lower substrate before the mounting of the image sensor.

According to a further aspect of the invention, a method of manufacturing an image sensor module, which includes a lower substrate having a plurality of top pads formed on the top surface thereof; an upper substrate that is installed along the edge of the top surface of the lower substrate and has a plurality of connection grooves formed on the inner side surface thereof, each connection groove having a side pad corresponding to each of the top pads of the lower substrate; and an image sensor installed on the top surface of the upper substrate, comprises the steps of: mounting various elements on the central portion of the top surface of the lower substrate; installing the upper substrate on the top surface of the lower substrate; electrically connecting the top pads to the sides pads by bonding conductive paste to the top pads of the lower substrate and the side pads of the upper substrate; and mounting the image sensor on the top surface of the upper substrate.

The method may further comprise the step of: sealing an exposed portion of the top surface of the lower substrate before the mounting of the image sensor.

According to a still further aspect of the invention, a camera module comprises an image sensor module including: a lower substrate having a plurality of top pads formed on the top surface thereof; an upper substrate that is installed along the edge of the top surface of the lower substrate and has a plurality of connection grooves formed on the inner side surface thereof, each connection groove having a side pad corresponding to each of the top pads of the lower substrate; an image sensor installed on the top surface of the upper substrate; and a connection element that electrically connects the top pads and the side pads; a housing that is installed on the image sensor module and has an IR (Infrared Ray) cut-off filter mounted therein; and a lens barrel that is installed on the housing and has a lens group mounted therein.

The connection element may be composed of solder which is provided on the top pads of the lower substrate and the side pads of the upper substrate through SMT.

The connection element may be composed of conductive paste which is bonded to the top pads of the lower substrate and the side pads of the upper substrate.

The upper substrate may be formed in a rectangular ring shape corresponding to the edge of the top surface of the lower substrate.

The upper substrate may be formed in a shape corresponding to one side, two sides facing each other, or three adjacent sides among four sides of the edge of the top surface of the lower substrate.

According to a still further aspect of the invention, a camera module comprises an image sensor module including: a lower substrate having a plurality of top pads formed on the top surface thereof; an upper substrate that is installed along the edge of the top surface of the lower substrate and has a plurality of connection grooves formed on the inner side surface thereof, each connection groove having a side pad corresponding to each of the top pads of the lower substrate; an image sensor installed on the top surface of the upper substrate; and a connection element that electrically connects the top pads and the side pads; and a barrel-integrated housing that is installed on the image sensor module and has a lens group mounted in the upper portion of the inside thereof and an IR cut-off filter mounted in the lower portion of the inside thereof.

According to a still further aspect of the invention, an image sensor module comprises a lower substrate that has a plurality of top pads and various elements mounted on the top surface thereof; and an upper substrate that is installed along the edge of the top surface of the lower substrate and has a plurality of connection grooves formed on the inner side surface thereof, each connection groove having a side pad corresponding to each of the top pads of the lower substrate, and an image sensor mounted on the top surface thereof.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures.

Hereinafter, an image sensor module, a method of manufacturing the same, and a camera module having the same according to the present invention will be described in detail with reference to the accompanying drawings.

Image Sensor Module

Figure 4:
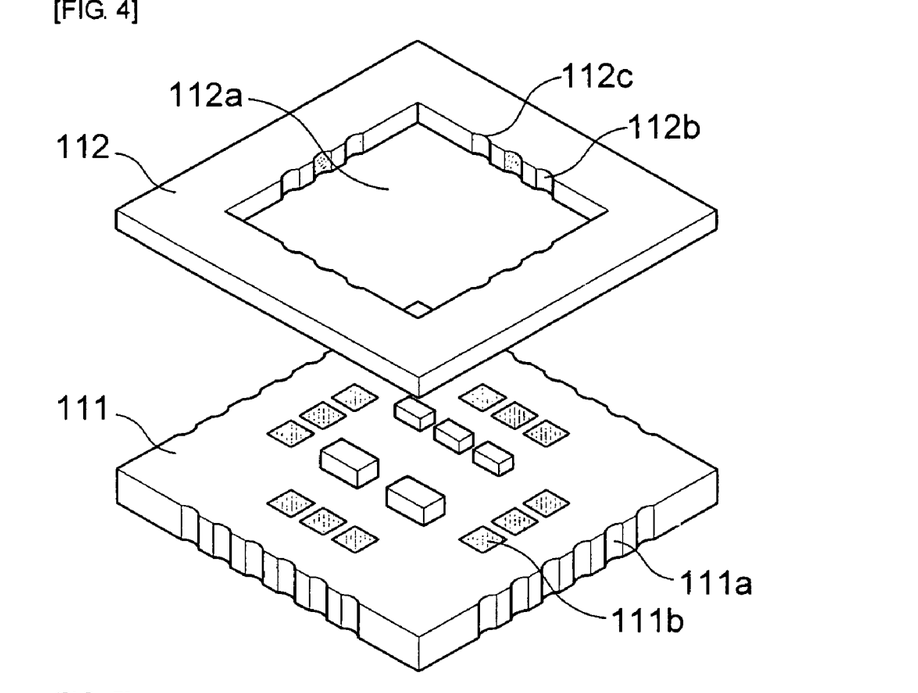
FIG. 4 is an exploded perspective view of an image sensor module according to an embodiment of the invention.
Figure 5:
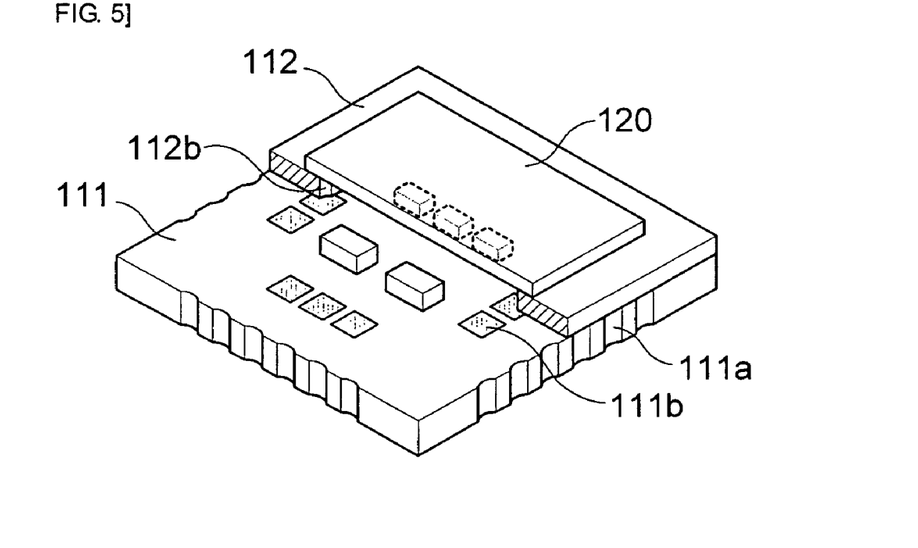
FIG. 5 is an assembled perspective view of the image sensor module of FIG. 4, showing a state where part of the image sensor module is cut off.
Figure 6:
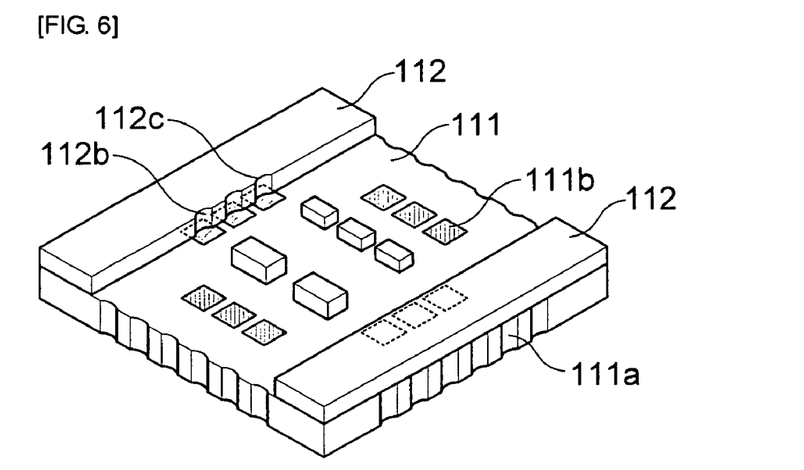
FIG. 6 is an assembled perspective view of an image sensor module according to a modification of the embodiment.

Referring to FIGS. 4 to 6, an image sensor module according to an embodiment of the invention will be described.

FIG. 4 is an exploded perspective view of an image sensor module according to an embodiment of the invention. FIG. 5 is an assembled perspective view of the image sensor module of FIG. 4, showing a state where part of the image sensor module is cut off. FIG. 6 is an assembled perspective view of an image sensor module according to a modification of the embodiment.

As shown in FIGS. 4 and 5, the image sensor module according to the embodiment of the invention includes a lower substrate 111 having a plurality of top pads 111b formed on the top surface thereof; an upper substrate 112 which is installed along the edge of the top surface of the lower substrate 111 and has a plurality of connection grooves 112c formed on the inner side surface thereof, each connection groove 112c having a side pad 112b formed therein to correspond to each of the top pads 111b; an image sensor 120 installed on the top surface of the upper substrate 112; and a connection element which electrically connects the top pads 111b of the lower substrate 111 to the side pads 112b of the upper substrate 112.

The lower substrate 111 has a plurality of terminal grooves 111a formed on the side surface of thereof, and an electrode pad (not shown) is formed in each of the terminal grooves 111a.

Therefore, the image sensor module can be connected to an external device such as a socket through the terminal grooves 111a and the electrode pads formed in the terminal grooves 111a.

The lower substrate 111 has various electronic parts, such as passive elements and so on, mounted on the center of the top surface thereof.

The electronic parts mounted on the center of the top surface of the lower substrate 111 include chips such as a driver IC, an image signal processor (ISP) and so on.

The connection element may be composed of solder which is formed on the top pads 111b of the lower substrate 111 and the side pads 112b of the upper substrate 112 through a surface mounting technology (SMT).

That is, as the upper substrate 112 is surface-mounted on the top surface of the lower substrate 111 through the top pads 111b of the lower substrate 111 and the side pads 112b, the top pads 111b and the side pads 112b are electrically connected to each other through the solder provided during the surface mounting.

Further, the connection element may be composed of conductive paste which is bonded to the top pads 111b of the lower substrate 111 and the side pads 112b of the upper substrate 112. The conductive paste may be silver (Ag) paste.

After the upper substrate 112 is received on the top surface of the lower substrate 111, the conductive paste is applied to the top pads 111b of the lower substrate 111 and the side pads 112b of the upper substrate 112 corresponding to the top pads 111b and is then cured. Accordingly, the top pads 111b and the side pads 112b can be electrically connected.

After the upper substrate 112 is installed on the top surface of the lower substrate 111, a portion of the top surface of the lower substrate 111, which is exposed to the outside, is preferably sealed by an insulating material such as epoxy resin.

Accordingly, it is possible to prevent foreign matters from entering the electronic parts such as passive elements mounted on the center of the top surface of the lower substrate 111.

Meanwhile, the upper substrate 112 has a through-hole 112a formed in the center thereof and may be formed in a rectangular ring shape corresponding to four sides of the edge of the top surface of the lower substrate 111. Further, as shown in FIG. 6, the upper substrate 112 may be formed in a shape corresponding to two sides facing each other in four sides of the edge of the top surface of the lower substrate 111. Further, the upper substrate 112 may be formed in a shape corresponding to one side or three adjacent sides in four sides of the lower substrate.

Since the lower and upper substrates 111 and 112 can be formed of a rigid printed circuit board (RPCB), the substrates can replace ceramic substrates applied to a conventional socket-type camera module, which makes it possible to reduce a manufacturing cost.

Meanwhile, the lower and upper substrates 111 and 112 of the image sensor module can be respectively manufactured as one module. Therefore, it is possible to simplify a manufacturing process and a manufacturing time.

That is, various passive elements can be mounted on the center of the lower substrate 111 so as to be manufactured as one module, and the image sensor 120 can be mounted on the top surface of the upper substrate 112 so as to be manufactured as one module. Then, as the upper substrate 112 having the image sensor 120 formed thereon is surface-mounted on the top surface of the lower substrate 111 having passive elements formed thereon, the image sensor module can be simply manufactured. Therefore, it is possible to simplify the manufacturing process and to reduce the manufacturing time.

As described above, in the image sensor module according to the embodiment of the invention, electronic parts such as passive elements are not mounted on the upper substrate 112 having the image sensor 120 mounted thereon, but are mounted on the center of the top surface of the lower substrate 111. Therefore, since a space required for installing passive elements on the top surface of the upper substrate 112 can be excluded, the size of the entire substrate composed of the upper and lower substrates 112 and 111 can be reduced into a size corresponding to that of the image sensor 120, which makes it possible to reduce the size of the image sensor module.

Method of Manufacturing Image Sensor Module

Figure 7:
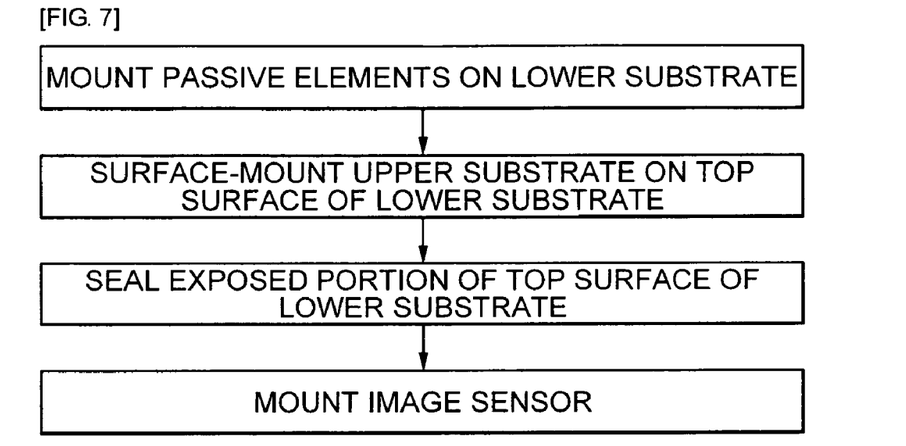
FIG. 7 is a flow chart showing a method of manufacturing an image sensor module according to an embodiment of the invention.

Referring to FIGS. 4, 5, and 7, a method of manufacturing an image sensor module according to an embodiment of the invention will be described.

As shown in FIG. 7, the method of manufacturing an image sensor module according to the embodiment of the invention includes the steps of: mounting various elements on the center of the top surface of a lower substrate 111; installing an upper substrate 112 on the top surface of the lower substrate 111 through SMT such that a plurality of top pads 111b of the lower substrate 111 are electrically to a plurality of side pads 112b formed in connection grooves 112c of the upper substrate 112; sealing an exposed portion of the top surface of the lower substrate 111; and mounting an image sensor 120 on the top surface of the upper substrate 112.

Referring to FIGS. 4 and 5, electronic parts such as various passive elements are mounted on the center of the top surface of the lower substrate 111.

Then, the upper substrate 112 is surface-mounted on the top surface of the lower substrate 111 through the top pads 111b of the lower substrate 111 and the side pads 112b of the upper substrate 112. Accordingly, the top pads 111b and the side pads 112b are electrically connected to each other through solder provided during the surface mounting.

Further, the exposed central portion of the top surface of the lower substrate 111 is sealed by an insulating material such as epoxy resin such that the electronic parts such as passive elements mounted on the center of the top surface of the lower substrate 111 are protected from the outside.

As the exposed central portion of the top surface of the lower substrate 111 is sealed, the subsequent process can be performed in the same manner as the existing process without any change, in a state where the upper and lower substrate 112 and 111 are set to a single substrate.

Next, as the image sensor 120 is mounted on the center of the top surface of the upper substrate 112, the image sensor module is completely manufactured.

Camera Module

Figure 8:
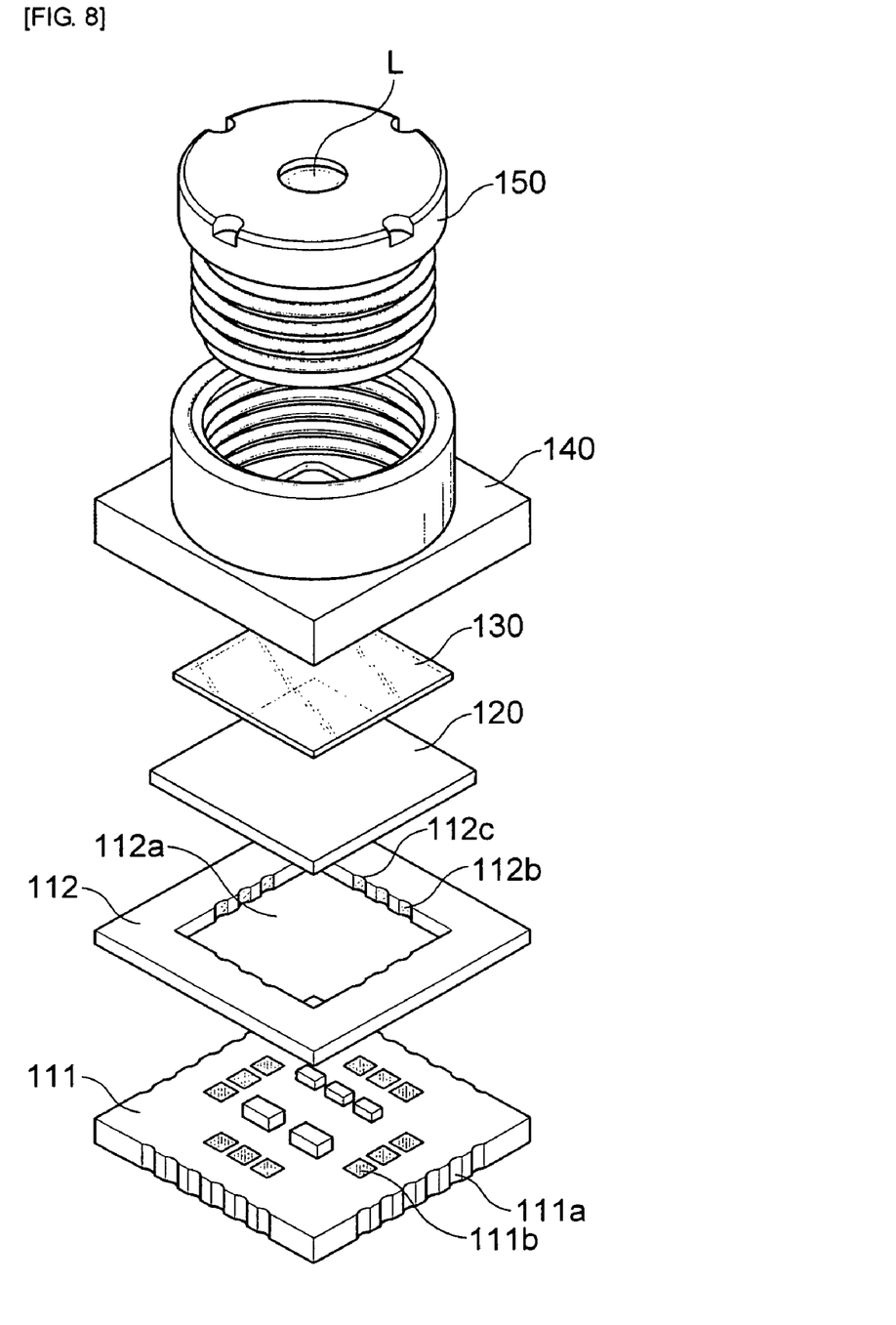
FIG. 8 is an exploded perspective view of a camera module to which the image sensor module according to an embodiment of the invention is applied.

Referring to FIG. 8, a camera module to which the image sensor module according to the invention is applied will be described.

FIG. 8 is an exploded perspective view of a camera module to which the image sensor module according to an embodiment of the invention is applied.

As shown in FIG. 8, the camera module includes the image sensor module according to the invention, a housing 140 which is installed on the image sensor module and has an IR cut-off filter 130 mounted therein, and a lens barrel 150 which is installed on the housing 140 and has a lens group L mounted therein.

As described above, the image sensor module includes a lower substrate 111 having a plurality of top pads 111b formed on the top surface thereof; an upper substrate 112 which is installed along the edge of the top surface of the lower substrate 111 and has a plurality of connection grooves 112c formed on the inner side surface thereof, each connection groove 112c having a side pad 112b formed therein to correspond to each of the top pads 111b; an image sensor 120 installed on the top surface of the upper substrate 112; and a connection element which electrically connects the top pads 111b of the lower substrate 111 to the side pads 112b of the upper substrate 112.

The lower substrate 111 has a plurality of terminal grooves 111a formed on the side surface thereof, and an electrode pad (not shown) is formed in each of the terminal grooves 111a.

Therefore, the image sensor module can be connected to an external device such as a socket through the terminal grooves 111a and the electrode pads formed in the terminal grooves 111a.

The lower substrate 111 has various electronic parts, such as passive elements and so on, mounted on the center of the top surface thereof.

The connection element may be composed of solder which is formed on the top pads 111b of the lower substrate 111 and the side pads 112b of the upper substrate 112 through SMT.

That is, as the upper substrate 112 is surface-mounted on the top surface of the lower substrate 111 through the top pads 111b of the lower substrate 111 and the side pads 112b, the top pads 111b and the side pads 112b are electrically connected to each other through the solder provided during the surface mounting.

Further, the connection element may be composed of conductive paste which is bonded to the top pads 111b of the lower substrate 111 and the side pads 112b of the upper substrate 112. The conductive paste may be Ag paste.

After the upper substrate 112 is received on the top surface of the lower substrate 111, the conductive paste is applied to the top pads 111b of the lower substrate 111 and the side pads 112b of the upper substrate 112 corresponding to the top pads 111b and is then cured. Therefore, the top pads 111b and the side pads 112b can be electrically connected.

After the upper substrate 112 is installed on the top surface of the lower substrate 111, a portion of the top surface of the lower substrate 111, which is exposed to the outside, is preferably sealed by an insulating material such as epoxy resin.

Accordingly, it is possible to prevent foreign matters from entering the electronic parts such as passive elements mounted on the center of the top surface of the lower substrate 111.

Meanwhile, the upper substrate 112 has a through-hole 112a formed in the center thereof and may be formed in a rectangular ring shape corresponding to four sides of the edge of the top surface of the lower substrate 111. Further, as shown in FIG. 6, the upper substrate 112 may be formed in a shape corresponding to two sides facing each other in four sides of the edge of the top surface of the lower substrate 111. Further, the upper substrate 112 may be formed in a shape corresponding to one side or three sides in four sides of the edge of the top surface of the lower substrate 111.

Since the lower and upper substrates 111 and 112 can be formed of an RPCB, the substrates can replace ceramic substrates applied to a conventional socket-type camera module, which makes it possible to reduce a manufacturing cost.

As described above, in the camera module to which the image sensor module according to the embodiment of the invention is applied, electronic parts such as passive elements are not mounted on the upper substrate 112 having the image sensor 120 mounted thereon, but are mounted on the center of the top surface of the lower substrate 111. Therefore, since a space required for installing passive elements on the top surface of the upper substrate 112 can be excluded, the size of the entire substrate composed of the upper and lower substrates 112 and 111 can be reduced into a size corresponding to that of the image sensor 120, which makes it possible to reduce the size of the camera module.

Further, various passive elements can be mounted on the center of the lower substrate 111 so as to be manufactured as one module, and the image sensor 120 can be mounted on the top surface of the upper substrate 112 so as to be manufactured as one module. Then, as the upper substrate 112 having the image sensor 120 formed thereon is surface-mounted on the top surface of the lower substrate having passive elements formed thereon, the image sensor module can be simply manufactured. Therefore, it is possible to simplify the manufacturing process and to reduce the manufacturing time.

In the camera module, the lens barrel 150 is coupled to the upper portion of the housing 140 through a screw method, and a distance between the lens group L and a light receiving section of the image sensor 120 is adjusted so as to adjust the focus of the camera module. However, instead of the construction of the housing 140 and the lens barrel 150, a barrel-integrated housing may be provided, in which a lens group is mounted in the upper side of the inside of the housing and an IR cut-off filter is mounted in the lower side of the inside of the housing.

The barrel-integrated housing is referred to as a housing in which the focal distance between the lens group mounted therein and the image sensor 120 mounted on the upper substrate 112 coupled to the lower portion thereof is previously adjusted.

In the camera module in which the barrel-integrated housing is used, the above-described image sensor module is applied.

Although not shown, the image sensor module according to the embodiment of the invention can be applied to a COF-type camera module.

Further, the image sensor module can be applied to a camera module having an actuator with an auto-focusing function.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of manufacturing an image sensor module which includes a lower substrate having a plurality of top pads formed on the top surface thereof; an upper substrate that is installed along the edge of the top surface of the lower substrate and has a plurality of connection grooves formed on the inner side surface thereof, each connection groove having a side pad corresponding to each of the top pads of the lower substrate; and an image sensor installed on the top surface of the upper substrate, the method comprising:

mounting various elements on the central portion of the top surface of the lower substrate;

installing the upper substrate on the top surface of the lower substrate so that a bottom surface of the upper substrate and the top surface of the lower substrate are contacted;

electrically connecting the top pads to the sides pads by bonding conductive paste to regions defined by contacting the top pads of the lower substrate and the side pads of the upper substrate; and mounting the image sensor on the top surface of the upper substrate.

2. The method according to claim 1 further comprising:

sealing an exposed portion of the top surface of the lower substrate before the mounting of the image sensor.

\* \* \* \* \*